(12) United States Patent
Mayer et al.

(10) Patent No.: US 11,703,567 B2
(45) Date of Patent: Jul. 18, 2023

(54) MEASURING DEVICE HAVING SCANNING FUNCTIONALITY AND SETTABLE RECEIVING RANGES OF THE RECEIVER

(71) Applicant: HEXAGON TECHNOLOGY CENTER GMBH, Heerbrugg (CH)

(72) Inventors: Tim Mayer, Horn (CH); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 872 days.

(21) Appl. No.: 16/116,769

(22) Filed: Aug. 29, 2018

(65) Prior Publication Data

US 2019/0064323 A1    Feb. 28, 2019

(30) Foreign Application Priority Data

Aug. 30, 2017    (EP) .................................... 17188481

(51) Int. Cl.
| | | |
|---|---|---|
| *G01S 7/48* | (2006.01) | |
| *G01S 7/481* | (2006.01) | |
| *G01S 17/08* | (2006.01) | |
| *G01S 17/10* | (2020.01) | |
| *G01S 7/486* | (2020.01) | |
| *G01S 17/42* | (2006.01) | |
| *G01S 7/4863* | (2020.01) | |
| *G01S 7/497* | (2006.01) | |

(52) U.S. Cl.
CPC .......... *G01S 7/4808* (2013.01); *G01S 7/4816* (2013.01); *G01S 7/4817* (2013.01); *G01S 7/4863* (2013.01); *G01S 7/4868* (2013.01); *G01S 7/497* (2013.01); *G01S 17/08* (2013.01); *G01S 17/10* (2013.01); *G01S 17/42* (2013.01)

(58) Field of Classification Search
None
See application file for complete search history.

(56) References Cited

U.S. PATENT DOCUMENTS

| | | | |
|---|---|---|---|
| 2011/0123068 A1* | 5/2011 | Miksa | ..................... G06T 5/002 382/167 |
| 2014/0078491 A1 | 3/2014 | Eisele | |

(Continued)

FOREIGN PATENT DOCUMENTS

| | | | | |
|---|---|---|---|---|
| CA | 2950937 A1 * | 6/2017 | .......... | G01S 7/4817 |
| EP | 1 832 897 B1 | 11/2010 | | |

(Continued)

OTHER PUBLICATIONS

European Search Report dated Feb. 7, 2018 as received in U.S. Appl. No. 17/188,481.

(Continued)

*Primary Examiner* — Yuqing Xiao
*Assistant Examiner* — Benjamin Richard Hebert
(74) *Attorney, Agent, or Firm* — Maschoff Brennan

(57) ABSTRACT

A measuring device can have a scanning functionality for optical surveying of an environment, wherein the measuring device has a sensor comprising an assembly of microcells as a receiving surface and direction-dependent active sections of the receiver are defined depending on the transmission direction of the transmitted radiation, in order to adapt the active receiver surface to a varying imaging position of the received radiation.

15 Claims, 8 Drawing Sheets

(56) References Cited

U.S. PATENT DOCUMENTS

| | | | | |
|---|---|---|---|---|
| 2015/0097951 A1* | 4/2015 | Barrows | ............ | H04N 5/35572 |
| | | | | 348/144 |
| 2016/0041266 A1* | 2/2016 | Smits | ...................... | G01S 7/497 |
| | | | | 356/5.01 |
| 2017/0301716 A1* | 10/2017 | Irish | .................. | H01L 27/14641 |
| 2017/0357000 A1* | 12/2017 | Bartlett | ................ | G01S 7/4817 |
| 2017/0371029 A1* | 12/2017 | Axelsson | ................ | G01S 17/42 |
| 2018/0045816 A1* | 2/2018 | Jarosinski | ............. | G01S 7/4863 |
| 2018/0143320 A1* | 5/2018 | Steever | ................... | G01S 17/36 |
| 2018/0284780 A1* | 10/2018 | McWhirter | ........... | G01S 7/4861 |

FOREIGN PATENT DOCUMENTS

| | | |
|---|---|---|
| EP | 2708914 A1 | 3/2014 |
| EP | 3 182 159 A1 | 6/2017 |
| WO | 2017/112416 A1 | 6/2017 |

OTHER PUBLICATIONS

Gundacker and Heering, "The silicon photomultiplier: fundamentals and applications of a modern solid-state photon detector" Phys. Med. Biol. 65 (2020) 17TR01.

Yokoyama et al., "Development of Multi-Pixel Photon Counters" SNIC Symposium, Stanford, California—Apr. 3-6, 2006.

\* cited by examiner

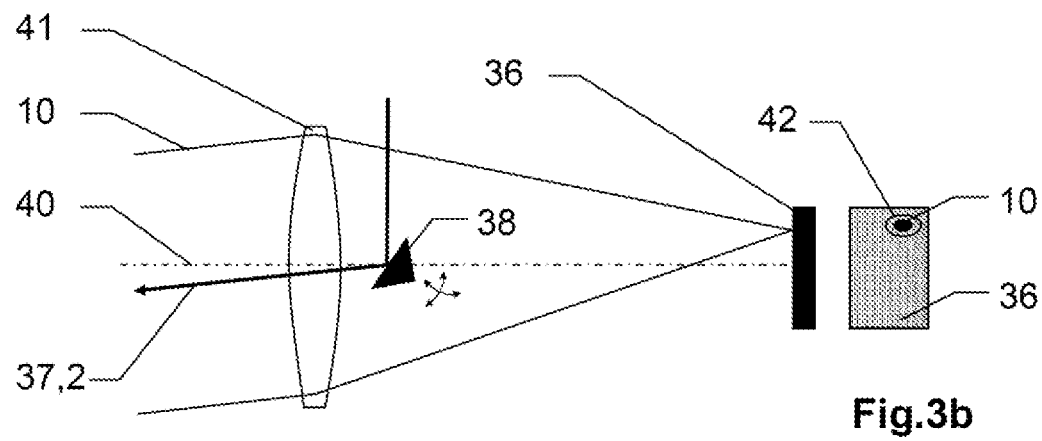
Fig.3a
Fig.3b
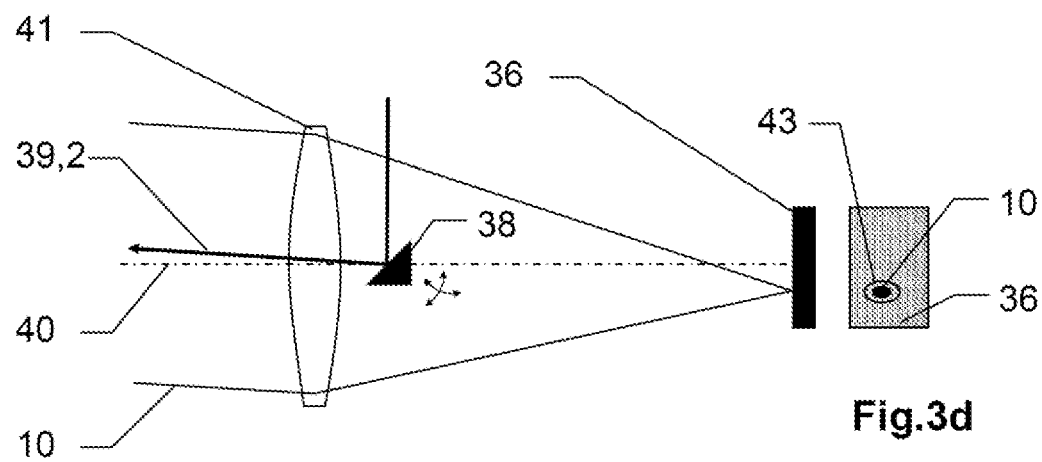
Fig.3c
Fig.3d

MEASURING DEVICE HAVING SCANNING FUNCTIONALITY AND SETTABLE RECEIVING RANGES OF THE RECEIVER

CROSS-REFERENCE TO RELATED APPLICATIONS

This application claims priority to European Patent Application No. 17188481.0 filed on Aug. 30, 2017, which is incorporated herein by reference.

FIELD OF THE INVENTION

The invention relates to a measuring device having scanning functionality for optical surveying of an environment.

BACKGROUND

Methods which carry out scanning by means of a laser scanner are frequently used for acquiring objects or surfaces in an environment. In this case, the spatial position of a surface point is acquired in each case by the distance to the targeted surface point being measured by the laser and this measurement being linked to items of angle information of the laser emission. The spatial position of the acquired point can be determined from these items of distance and angle information and, for example, a surface can be surveyed in an ongoing manner. In parallel to this solely geometric acquisition of the surface, an image recording by a camera is often also carried out, which also provides further items of information, for example, with respect to the surface texture, in addition to the visual overall view.

3D scanning is a very effective technology for producing millions of individual measurement data, in particular 3D coordinates, within minutes or seconds. Typical measuring tasks are the recording of objects or the surfaces thereof such as industrial plants, house façades, or historical buildings, but also accident locations and crime scenes. Surveying devices having scanning functionality are, for example, total stations or theodolites, which are used in order to measure or create 3D coordinates of surfaces. For this purpose, they have to be capable of guiding the measuring beam, usually a laser beam, of a distance measuring device over a surface or along an edge and thus successively acquiring direction and distance to the respective measurement points simultaneously in various measurement directions at a predefined scanning or measuring rate. Direction and distance are in relation in this case to a measurement reference point, for example, the location or zero point of the surveying device, in other words, they are located in a common reference or coordinate system, and therefore the individual measurement directions and thus the individual measurement data are linked to one another via the local coordinate system. Subsequently, for example, by means of an integrated or external data processing system, a so-called 3D point cloud can therefore be generated from the plurality of the scanned points from the distance measured value and the measurement direction correlated therewith for each point.

Measuring devices having scanning functionality are moreover used, for example, as lidar systems, for example, for airborne landscape surveying. In this case, laser pulses are transmitted to the surface from a moving carrier, in particular an aircraft or a drone (UAV, "unmanned aerial vehicle"), via a rapidly settable deflection element, for example, a scanning mirror ("sweeping mirror") or a refracting optical component, according to a defined scanning grid. Based on returning parts of the radiation emitted to the surface and the intrinsic movement of the carrier, for example, acquired by means of a global satellite positioning system (GSNS, "global navigation satellite system") and/or by means of an inertial measuring system (IMU, "inertial measuring unit"), an accurate surface model of the surface to be surveyed can thus be derived.

Further measuring tasks of scanning measuring devices are, for example, the monitoring of an environment, for example, in the context of a warning or monitoring system for an industrial manufacturing plant, or in the use in driver assistance systems.

Further applications of scanning measuring devices are, for example, the determination of shape and area of tunnel cross sections or in the volume determination of excavation pits or gravel heaps.

In the field of autonomously driving vehicles, the roads to be traveled are typically acquired in advance and imaged in a model. For this purpose, for example, vehicles equipped with scanners are used, which scan and map the relevant region. A lidar module used in this case has to meet specialized requirements for this task, for example, in particular with respect to field of vision and acquisition rate. For example, the horizontal field of vision is supposed to comprise approximately 80°, wherein the required vertical field of vision is typically substantially smaller, for example, approximately 25°. The acquisition rate for the scanning of the complete field of vision is typically approximately 25 Hz.

With respect to the fundamental structure, such scanning measuring devices are designed, for example, having an electro-optical laser-based distance meter, in order to acquire a distance to an object point as a measured point, wherein moreover a measurement direction deflection unit is provided in order to vary the transmission direction of the distance measuring beam, for example, with respect to one or more independent spatial directions, whereby a three-dimensional measuring or scanning region can be acquired.

Various principles and methods are known in the field of electronic and/or electro-optical distance measurement. One approach is to emit pulsed electromagnetic radiation, for example, laser light, onto a target to be surveyed and subsequently to receive an echo from this target as a backscattering object, wherein the distance to the target to be surveyed can be determined, for example, on the basis of the runtime, the shape, and/or the phase of the pulse. Such laser distance meters have become established in the meantime in many fields as standard solutions.

Usually, two different approaches or a combination thereof are used for detecting the backscattered pulse or a pulse sequence.

In the so-called threshold value method, a light pulse is detected if the intensity of the radiation incident on a detector of the distance measuring device used exceeds a certain threshold value. This threshold value prevents noise and interfering signals from the background from being detected incorrectly as a useful signal, i.e., as backscattered light of the emitted pulse.

However, it is problematic that in the case of weak backscattered pulses, for example, as are caused by greater measurement distances, a detection is no longer possible if the pulse intensity falls below the detection threshold, i.e., below the threshold value. The essential disadvantage of this threshold value method is therefore that the amplitude of the measurement signal has to be sufficiently greater than the noise amplitude of optical and electrical noise sources in the signal path, in order to minimize false detections sufficiently, and therefore the threshold value method only has limited usability for measurements at relatively great distances.

The other approach is based on the scanning or sampling of the backscattered pulse. This approach is typically used in the case of weak backscattered signals (for example, pulse signals), as are caused, for example, due to greater measurement distances. This method can also be considered to be integrated signal acquisition, wherein both the overall signal information and also the essential noise information are acquired by the sampling, which results in an enhancement of the measurement accuracy. An emitted signal is detected by the radiation acquired by a detector being sampled, a signal being identified within the sampled range, and finally a location of the signal being determined with respect to time. Due to the use of a plurality of sampled values and/or summation of the reception signal synchronized with the emission rate, a useful signal can be identified even under unfavorable circumstances, and therefore greater distances or background scenarios which are noisy or subject to interference can also be managed.

SUMMARY

Presently, in some embodiments the entire waveform of the analog signal of the radiation acquired by a detector is frequently sampled by means of the waveform digitization method ("waveform digitizing", WFD). After identification of the coding of the associated emitted signal (ASK, FSK, PSK, also called distance or interval modulation, etc.) of a reception signal, for example, a signal runtime ("pulse runtime") is determined very accurately by means of Fourier transform or from a defined curve point of the sampled, digitized, and reconstructed signal, for example, the inflection points, the curve maxima, or integrally by means of an optimum filter known from time interpolation.

Alternatively or additionally to the determination of the pulse runtime, a (rapid) sampling often also takes place with respect to amplitude, phase, polarization, wavelength, and/or frequency of coded or modulated pulses or pulse sequences.

For example, in some embodiments of the approach of the chronologically very precise sampling of the backscattered signal, the electrical signal generated by the detector is converted by means of an analog-to-digital converter (ADC) into a digital signal sequence. This digital signal is subsequently further processed, usually in real time. In a first step, this signal sequence is decoded by special digital filters (ASK, FSK, PSK, etc.), i.e., recognized, and finally the location of a signature describing a time interval within the signal sequence is determined.

Examples of time-resolving signatures are focal point, sine-cosine transformation, or, for example, amplitude-scaled FIR filter ("finite impulse response filter") comprising a weight coefficient set derived from the pulse form. To eliminate possible distance drifts, a corresponding time-resolving signature is also compared to an internal starting signal. To avoid irreversible sampling errors, additional digital signal transformations known to a person skilled in the art are applied.

One of the simplest types of modulation is the identification of the individual pulses or the pulse sequences via interval coding as described, for example, in EP 1 832 897 B1. This is used for the purpose of reidentification ability, for example. This reidentification is required if an ambiguity arises, which can be induced by different situations in the runtime measurement of pulses, for example, if more than one pulse or one pulse group is located between surveying device and target object. The pulse coding is advantageous in particular in multibeam systems consisting of multiple laser beams and associated receiving sensors.

The deflection unit can be implemented in the form of a moving mirror or alternatively also by way of other elements suitable for the controlled angle deflection of optical radiation, for example, pivotable prisms, movable optical waveguides, light-refracting optical elements, deformable optical components, etc. The measurement usually takes place with determination of distance and angles, i.e., in spherical coordinates, which can also be transformed into Cartesian coordinates for the display and further processing.

A scanning measuring device can have in particular two separate beam paths for the transmitted radiation and the received radiation or the beam paths of the transmitting channel and the receiving channel can at least partially overlap. In particular, the beam paths can thus be designed such that the deflection unit only acts on the transmitted radiation, i.e. the imaging effect of the receiving channel is substantially independent of the actuation of a beam deflection element of the deflection unit, the transmitting channel and the receiving channel each have a separate, for example, separately actuable deflection unit, or a single deflection unit acts both on the transmitted radiation and also on the received radiation.

If the deflection unit only acts on the transmitted radiation, this has the disadvantage, for example, that due to the varying angle of incidence, the imaging position of the received radiation on the receiver varies and therefore a larger receiver surface is necessary than if, for example, the imaging position is stabilized by means of a corresponding optical unit. However, the background light component is also elevated by the larger receiver surface, which can result in a worsened signal-to-noise ratio as a result of shot noise, for example. Such measuring devices are therefore typically used for measuring tasks where only a small spatial angle range is to be scanned, and therefore the receiver surface can be kept small.

The background light component can be reduced, for example, by a suitable selection of the wavelength of the transmitted radiation and the installation of corresponding filters in the reception path. However, this typically elevates the complexity of the light source, since it has to have a defined and stable wavelength. This is complex, requires special stabilization measures, and at the same time also prevents, for example, a more compact construction of the measuring device.

In particular for measuring tasks where larger spatial angle ranges are to be scanned, the deflection unit is therefore often arranged such that the imaging position of the received radiation on the receiver is stabilized by the same beam deflection element in the transmitting and receiving channels or by separate beam deflection elements respectively in the transmitting and receiving channels. The receiver surface can thus be optimized, for example, with respect to the beam diameter of the average received beam and thus be kept relatively small.

In particular in airborne lidar systems, the measurement distance to the earth's surface can be several kilometers (up to 5 km), wherein the angle setting rate of the deflection unit is relatively high (for example, 200-300 rad/s). This has the result, for example, that the setting of the deflection unit, for example, the position of a single deflection mirror in a common beam path of the transmitted and received radiation, is different for an outgoing transmission signal and an incoming reception signal corresponding thereto.

For example, the runtime for a pulse moving at the speed of light (approximately 300,000 km/s) is 33 µs at a flight altitude of 5 km. With an angle setting rate of the deflection element shared by the transmitting and receiving channels of 200 rad/s, this results in a targeting error of 6.6 mrad. This thus means that the receiver looks 6.6 mrad away from the position where the laser beam strikes the ground. If the laser beam has a beam diameter of, for example, 0.2-0.5 mrad, the field of vision of the receiver—in order to collect all light returning from the laser beam—thus has to cover 10 to 20 times the diameter of the laser beam. If the lidar scanner moreover can execute a complex two-dimensional scanning grid, the targeting error takes place in all directions of the laser beam, whereby the field of vision requirement for the receiver is thus doubled once again.

To keep the receiver small and thus in turn reduce, for example, the background light component, various methods are known in the prior art to compensate for the targeting error as a result of the finite runtime as a function of the measurement distance, for example, by means of distance-dependent actuations of complex optical compensation elements in the reception path. However, the individual solutions always require a compromise with respect to device parameters, for example, device size, system complexity, measurement accuracy, measurable distance range, or flexibility with respect to settable scanning patterns.

The object of some embodiments of the invention is to provide a measuring method or a measuring device, whereby the disadvantages known from the prior art are avoided, in particular wherein rapid and precise measurements are enabled over an extended distance measurement range.

This object is achieved by the implementation of the characterizing features of the independent claim. Features which refine the invention in an alternative or advantageous manner can be inferred from the dependent patent claims.

Some embodiments relate to a measuring device for optical surveying of an environment, having a radiation source for generating a transmitted radiation, for example, pulsed laser measuring radiation, a transmitting channel for emitting at least a part of the transmitted radiation, a beam deflection element in the transmitting channel, which is configured to deflect the transmitted radiation and to set a chronologically variable transmission direction of the transmitted radiation from the transmitting channel, and a receiving channel comprising a receiver which is configured to acquire a reception signal based on at least a part of the returning transmitted radiation, referred to hereafter as received radiation. The measuring device furthermore has a control electronics unit, which is configured to control the measuring device based on a preprogrammed measuring procedure, and an angle determining unit for acquiring angle data with respect to the transmission direction of the transmitted radiation, and a computer unit for deriving distance measurement data based on the reception signal. By way of the measurement procedure, in particular sweeping scanning is carried out by means of the transmitted radiation, based on a defined ongoing, in particular continuous actuation of the beam deflection element for the ongoing change of the transmission direction of the transmitted radiation, an ongoing emission of the transmitted radiation and an ongoing acquisition of the reception signal, and a derivation of the distance measurement data.

According to some embodiments of the present invention, the receiver for acquiring the reception signal has an optoelectronic sensor based on an arrangement of microcells, in particular wherein the sensor is designed as an arrangement of single-photon avalanche photodiodes, wherein the sensor has a plurality of microcells and is configured such that the microcells can be read out individually and/or in microcell groups and thus active sections of the receiver which can be read out individually are settable. Can be read out means that the microcells or the microcell groups have a signal output which permits the determination of the runtime in picoseconds or subpicoseconds. In the context of the measurement procedure, the actuation of the beam deflection element and the acquisition of the reception signal are synchronized such that the acquisition of the reception signal takes place based on an active section of the receiver, wherein the active section is set based on the angle data defining the transmission direction of the transmitted radiation and/or based on distance measurement data, in particular distance measurement data with respect to an immediately preceding actuation of the beam deflection element.

In some embodiments, the receiver has an overall detector surface according to the present invention, wherein a setting of a section of the overall detector surface as an active acquisition region/an active section takes place, wherein the active acquisition region is settable in a chronologically variable manner with respect to its position on the overall detector surface, in particular wherein the active acquisition region is furthermore settable in its shape and/or its dimensions, and wherein a receiver signal dependent on the setting of the active acquisition region is generated by received radiation incident on the overall detector surface.

On the one hand, if the beam deflection element only acts on the transmitted radiation, for example, a separate compensation on the receiving channel side typically has to be provided with respect to the angle of incidence of the returning beam in the receiving channel, which varies due to the movement of the beam deflection element. According to the invention, this compensation thus takes place on the detector side, based on the sensor according to the invention and depending on the transmission direction of the transmitted radiation.

On the other hand, for example, if the imaging position of the received radiation on the receiver is stabilized by the same beam deflection element in the transmitting and receiving channels or by separate beam deflection elements respectively in the transmitting and receiving channels, as a result of the finite signal runtime and the movement of the beam deflection element, an angle difference occurs between the outgoing transmitted radiation and the received radiation, with respect to the respective angle of incidence on the beam deflection element, which has the result that the receiver looks away, depending on the distance, from the position where the laser beam is incident on the irradiated surface. This offset dependent on the present distance is compensated for by the use according to the invention of the sensor.

The sensor can be, for example, an assembly of single-photon avalanche photodiodes. Assemblies of single-photon avalanche photodiodes, also called SPAD assembly or SPAD arrays, are generally arranged as a matrix structure on a chip. The assemblies or chips having a photosensitivity in the visible and near infrared spectral range are also referred to as SiPM (silicon photomultiplier). The SiPM are gradually replacing the previously used photomultiplier tubes, in particular in the visible and near-ultraviolet spectral range. SiPM have a high spectral sensitivity in the visible wavelength range. For example, SPAD arrays are available in the prior art, which are based on silicon, manufactured using CMOS technology, and sensitive up into the near infrared range, up to well over 900 nm wavelength.

The special feature of these SPAD arrays is the high amplification thereof, because of which these have heretofore been used in the case of very weak optical signals, where only 1 to 50 photons are incident on the sensor. Such sensors, which are airborne, for example, are also referred to as SPL-lidar (SPL="single-photon lidar"). However, with only a few photons, the distance noise is substantial and is typically 10 mm to 100 mm.

Moreover, the absolute distance measurement accuracy is influenced by the signal strength, in particular in SPAD arrays having few microcells. In contrast, a distance noise of much less than 1 mm can be achieved by special measures, for example, a range walk compensation, whereby a measurement accuracy of 0.1 mm is achieved. This corresponds to a typical time resolution of one picosecond or less.

Commercial SPAD arrays are also available at wavelengths between 800 nm and 1800 nm. These sensors primarily consist of the semiconductor material InGaAs. These sensors also have an external or internal matrix structure above the photosensitive surface depending on the design. Distance measuring systems comprising SPAD arrays in this spectral range have the advantage that the solar background light (daylight) is significantly lower in relation to the visible wavelength range and this interfering luminous flux thus interferes less with the SPAD arrays.

The special feature of these SPAD array sensors is the very high photosensitivity, wherein the SPAD arrays are primarily designed for the purpose of being able to detect individual photons correctly. They are therefore also referred to as "multi-pixel photon counters" (MPPC). The SPAD arrays consist of hundreds, thousands, or up to more than 10,000 microcells and are thus capable of receiving pulses having thousands or hundreds of thousands of photons simultaneously. Moreover, because of the parallel connection of the many microcells into cell groups (domains), sufficient free cells for the signal photons are still present even in the event of solar background light.

A further special feature of SPAD assemblies is in particular that individual microcells or individual subsets of microcells can be actuated separately and/or read out separately. The microcells can thus be sequentially actuated locally, for example, for a line-by-line or column-by-column read-out of the receiver (for example, as a "rolling shutter" or "rolling frame"). In particular, sections of the receiver which can be read out individually depending on the transmission direction can thus be defined.

For example, the sections can be defined such that they each represent a spatial sequence of adjacent microcells. The sections can also be defined by respective spaced-apart regions of the receiver, however, i.e., the individual sections do not represent a coherent sequence of microcells.

In particular, the individual sections can be defined such that they at least partially mutually overlap.

For example, the sections can furthermore be adapted to one another such that by a sequence of signal acquisitions by individual sections, for example, individual microcells or microcell groups (domains) of the SPAD assembly can be conducted to the output alternately, for example, alternately even and odd lines (with respect to the SPAD assembly) within the sections.

Such a chronologically alternating activation of microcells or microcell groups results, for example, in a shortening of the recovery time of the SPAD array, whereby a more rapid laser modulation or firing rate is possible.

Instead of activating the microcells or microcell groups (domains) of the SPAD assembly, they can remain activated in a stationary state, for example, in order to acquire and analyze the outputs of the microcells or microcell groups (domains) synchronously with the transmitter-side scanning movement for the "rolling shutter" or "rolling frame" function. In this case, by means of an electronic circuit, integrated on the SPAD array, for example, precisely the microcells or microcell groups (domains) are connected to the signal output which are aligned synchronously in time toward the surface of the object, which are irradiated by the transmitter-side laser. If the scanning movement of the laser moves in the vertical direction, the effective receiver-side domain shifts synchronously in the same direction, and therefore the (effective) field of vision (FoV, "field of view") of the active receiving unit can receive the laser spots on the object in a timely manner. The respective active FoV of the receiving unit is designed sufficiently small in the angle range that the backscattered received pulses can be completely seen and received and at the same time as little interfering ambient light is received as possible.

According to the invention, active subregions of the receiver are thus defined in a direction-dependent manner depending on the transmission direction of the transmitted radiation, in order to adapt the receiver surface to a varying imaging position of the received radiation, for example, to compensate for a targeting error as a result of the finite runtime and a rapidly rotating deflection mirror as a function of the measurement distance. The respective used receiver surface can thus be optimized with respect to the incident received beam. For example, the active receiving surface can be substantially adapted to the beam diameter of the respective received beam. The background light component can therefore also be kept low for each individual measurement using a receiver which is overdimensioned with respect to the beam diameter.

In contrast to the comparatively costly photomultiplier tubes having large time jitter, the modern SiPM sensors are cost-effective and have time jitter in the picosecond to subpicosecond range. Moreover, the SiPM arrays are manufactured by means of a conventional CMOS technology process, which additionally enables the integration of electronic components and circuits. This applies accordingly to the SPAD arrays made of the semiconductor material InGaAs.

The high photosensitivity is to be attributed to the avalanche mechanism, wherein the individual microcells of the array are operated, for example, in the overvoltage range ("reverse voltage beyond the break voltage"), i.e., beyond the breakthrough voltage (break voltage), at which a single photon triggers an avalanche of electrons, whereby the signal is strongly amplified depending on the setting, for example, an amplification up to a factor of one million. The current associated with the photon is easy to convert into a voltage signal and supply to a signal analysis unit without substantial amplification because of its strength.

An SPAD array is capable of receiving multiple photons simultaneously, wherein the currents of the many microcells can be added on the sensor chip and subsequently converted, for example, via a resistor or a trans-impedance amplifier into a voltage signal. The SPAD array can be configured, for example, such that, for example, having more than 10,000 microcells, it behaves like an analog photosensor, wherein the characteristic curve is approximately proportional to the intensity of the incident laser pulse, for example, in the case of weak reception signals.

The literature differentiates between SPAD array operations in the linear mode, Geiger mode, and SPL mode (SPL, "single-photon lidar").

In the linear mode below the breakthrough voltage, an amplification dependent on reverse voltage and temperature occurs and SPAD arrays can be used, for example, to construct high-sensitivity photoreceivers having output voltage proportional to the radiant power.

In the Geiger mode and SPL mode, i.e., in each case in operation above the breakthrough voltage, SPADs and SPAD arrays can be used for single-photon counting. In the SPADs, each individual pixel generates an output signal in the Geiger mode, wherein the electron avalanche is triggered by precisely one photon. If a photon packet made of multiple photons is incident, a greater signal is not measured, therefore no amplitude information is provided.

In the Geiger mode, an incident photon packet merely generates a (binary) event signal, which is not proportional to the number of photons in the photon packet.

SPL mode is understood as an SPAD array operated in the Geiger mode, where many microcells are connected in parallel to form an output signal. In the event of incident photon packets having only a few photons, the individual avalanches add up practically linearly and the amplitude of the output signal is therefore proportional to the number of acquired photons.

The recovery time of the microcells after a photonic trigger is not zero but rather, for example, between 5-50 ns, whereby the apparent sensitivity of the SPAD array is reduced for subsequent incident photons. However, this has the advantage, for example, that the sensor can acquire a signal strength range with high dynamic response. This nonlinearity is monotonous in SPAD arrays having a large number of microcells (>1000) and results in an amplitude compression between input and output signals, on the one hand, and an attenuated increasing output signal as the input signal becomes greater, on the other hand. Interestingly, the output signal of SPAD arrays having a high number of microcells (>1000) does not completely saturate, and therefore even in the event of a received pulse having a very high number of photons of well over a million, an amplitude change is measurable.

An SPAD array having sufficient number of cells acquires the reception signal amplitude over a large dynamic range and to some extent compresses the input amplitude of very small to very large signals. The SPAD array never overloads, not even in the event of very large signals, for example, not even if the radiation is reflected by an angle-precise retroreflector. In the event of a number of photons of $10^9$, the output signal of the SPAD array asymptotically approaches a maximum limiting voltage, this limiting voltage is adapted to the downstream amplifier circuit and guarantees that the downstream electronics unit up to the time measuring circuit is not overloaded. An accurate distance measurement is thus possible for the first time over a high dynamic range.

In the case of laser distance measurement at different distances and on varying surfaces, the number of the photons can vary, for example, from fewer than 10 to greater than $10^9$. SPAD arrays, in contrast, have a compression factor of the measured signal amplitude which is at least $10^4$, typically $10^8$ in relation to the actual signal amplitude. It is therefore possible to measure both on black diffuse targets and also on retroreflectors using SPAD arrays, without the receiving unit requiring a signal regulation. Due to the large amplification, SPAD arrays moreover have, for example, a low noise and SPAD arrays having high filling factor display a signal-to-noise ratio (SNR) suitable for distance measurements. The more microcells an SPAD array has, the greater is the SNR.

A pulse coding is generally applied to the laser signals of a distance meter. Typical pulse rates are between kilohertz to gigahertz. Experiments have shown that such signals can be received well with SPAD arrays at voltages in the overbreak operation. Pulse packets (bursts) can also be received unambiguously and nearly without noise using SPAD arrays. This is also the case, for example, if the recovery time of the microcells is quite long at ns. Because of the quasi-analog structure of SPAD arrays, a photocurrent present due to ambient light, for example, can also be received. The laser signal is then overlaid on the electrical photocurrent of the ambient light. For example, the current surge generated by the laser pulse at the output of the SPAD array is high-pass filtered, so that the slow rear signal flank is shortened. The output pulse thus becomes a short signal pulse, for example, having a pulse duration less than 1 ns. Such short pulses having steep flanks are suitable for precise time measurement and therefore also distance measurement. The use of a high-pass filter (differentiator) has no influence on the recovery time of the SPAD array, however.

Furthermore, first implementation experiments have already been undertaken to integrate more electronic functionality into the SPAD arrays. For example, time measuring circuits ("TOF circuitries") associated with each microcell measure the runtime (TOF, "time-of-flight"). SPAD array implementations exist, for example, wherein a precise photon count is integrated close to the microcells, which manages without a downstream analog-to-digital converter (ADC). Moreover, for example, a time measuring circuit (TDC, "time to digital converter") can be integrated in each microcell. Furthermore, a digital interface is used as the output of the SPAD array, for example. Such building blocks are completely digital and do not require "mixed signal processing" in the CMOS production.

By way of the receiving channel according to the invention, the measuring device can be designed for high scanning speeds by means of a rapid movement of the beam deflection element. A measure is required on the receiver side which tracks the field of vision (FoV, "field of view") of the receiving unit synchronously with the transmitter-side scanning.

This measure is that, for example, at a certain point in time, only one domain, i.e., one subgroup of microcells of the SPAD array is connected to the signal output, which is aligned accurately in the direction of the light spot on the object. Since the light spots are pivoted by the beam deflection element in a scanning manner over the object to be surveyed, the active domain of the SPAD array is pivoted synchronously over the object solely by circuitry. This active domain of the SPAD array forms the active field of vision of the receiving unit. This respective active field of vision of the receiving unit is intentionally designed narrow, so that as little sunlight as possible is received and as few microcells as possible of the active domain are incorrectly triggered. The activated sections of the receiver move synchronously with the light spot over the surface of the SPAD array, in such a way that the active microcells partially or entirely encompass the light spot. Due to this electronic scanning, also called "solid state scanning", no moving parts, for example, MEMS scanner, wedge scanner, polygon prism wheel, or polygon mirror wheel are required on the reception side.

According to one embodiment of the invention, the measuring device has an inertia meter which is configured to acquire inertia data with respect to an intrinsic movement of the measuring device, in particular a displacement and/or tilt (6 degrees of freedom, 6 DoF), and wherein the active section used in the scope of the measurement procedure is selected based on the inertia data.

In particular, the measuring device is configured according to a further embodiment, for example, to acquire a time curve of the intrinsic movement of the measuring device, and to estimate the intrinsic movement of the measuring device in advance based on the time curve, wherein the active section used in the scope of the measurement procedure is selected based on the estimated intrinsic movement of the measuring device, in particular in consideration of a time curve of initially derived distance measurement data.

For example, vibrations of the measuring device can thus be compensated for, for example, a residual vibration of a measuring instrument which is gimbal-mounted in an aircraft.

The angle data with respect to the transmission direction of the transmitted radiation are derived, for example, on the basis of control signals for the actuation of the beam deflection element and/or based on angle measurement data which are provided, for example, by one or more angle meters present in the measuring device.

According to a further embodiment, the measuring device is configured to derive a position of incidence of the received radiation on the sensor, in particular by means of focal point determination or maximum determination of the acquired reception signal, and in order to derive an item of correction information with respect to the angle data based on the position of incidence and the distance measurement data.

Accurate referencing of distance measurement data for a creation of a point cloud can thus be achieved, for example, wherein angle meters in the measuring device can be omitted, for example. It can therefore be sufficient under certain circumstances, for example, if the (initially) derived angle data are only based on control signals for the actuation of the beam deflection element and the initially derived angle data for the referencing in a point cloud are corrected based on the position of incidence.

In a further embodiment, the measuring device is configured to estimate, based on the angle data, a first item of imaging information for a beam shape and/or location of the received radiation imaged on the receiver, in particular based on a defined fixed focus optical unit of the receiving channel, wherein the active section used in the scope of the measurement procedure is selected based on the estimated first item of imaging information.

In particular, the measuring device can be configured according to a further embodiment in order to estimate, based on feedback of the receiver with respect to a previously acquired reception signal, a second item of imaging information for a beam shape and/or location of the received radiation imaged on the receiver, wherein the active section used in the scope of the measurement procedure is selected based on the estimated second item of imaging information.

According to a further embodiment, the measuring device is configured to estimate, based on the distance measurement data, a third item of imaging information for a beam shape and/or location of the received radiation imaged on the receiver, wherein the active section used in the scope of the measurement procedure is selected based on the estimated third item of imaging information.

In one embodiment, the receiving channel is configured such that the imaging effect of the receiving channel is substantially independent of the actuation of the beam deflection element, in particular wherein the beam deflection element is arranged such that it solely acts on the transmitted radiation. This thus means that the receiving channel has a static optical axis, i.e., no optical direction correction of the incident received beam takes place.

Alternatively, the receiving channel can be configured according to a further embodiment of the invention, for example, such that the imaging effect of the receiving channel is dependent on the actuation of the beam deflection element, which is arranged such that it also acts on the received radiation, and therefore depending on the actuation of the beam deflection element, a first deflection angle of the transmitted radiation and a second deflection angle of the received radiation are provided. The measuring device is configured in this case to estimate an angle difference between the first and second deflection angles, based on an estimation of the time difference between the point in time of the passage of the beam deflection element by the transmitted radiation and the point in time of the passage of the beam deflection element by the associated received radiation, wherein the active section used in the scope of the measurement procedure is set based on the estimated angle difference.

Therefore, for example, a targeting error as a result of the finite runtime can be compensated for as a function of the measurement distance, wherein the complexity of the optical structure can be kept low at the same time.

In particular, according to a further embodiment, the angle difference is estimated in this case based on at least one element from a distance to a target object in the environment, in particular based on initially acquired distance measurement data, a setting rate of the chronologically variable transmission direction, a sampling pattern defined by the measurement procedure for the sweeping scanning by means of the beam deflection element, and the intrinsic movement of the measuring device.

For example, the angle difference can furthermore be estimated based on a continuously occurring trend estimation on the basis of previously estimated angle differences, in particular based on the last three immediately preceding angle differences.

Furthermore, according to a further embodiment, the receiver can have multiple sensors, wherein the multiple sensors are arranged one-dimensionally or two-dimensionally in relation to one another, in particular wherein each sensor has a separate actuation electronics unit and/or analysis electronics unit. In such arrangements of sensors, for example, SPAD arrays, the individual arrays are often referred to as pixels, although each of these pixels itself consists of hundreds to tens of thousands of microcells.

Furthermore, according to a further embodiment, the receiver is designed such that a set of active sections which can be read out in parallel with respect to time is definable, in particular wherein the radiation source is configured to generate a bundle of differently oriented and/or spaced-apart laser measuring beams generated in parallel, wherein the sections of the set of active sections are defined in this case such that they are each associated with one laser measuring beam of the bundle of laser measuring beams. Thus, for example, multibeam sampling can take place using multiple parallel and/or divergent laser measuring beams.

According to a further embodiment, the receiver has a radiation-opaque blocking element for the received radiation on the received radiation side, wherein the blocking element is configured such that a transmission region which is settable variably with respect to time is set for the transmission of the received radiation to the overall detector surface of the receiver, wherein the position of the transmission region is settable with respect to the overall detector surface, in particular wherein the transmission region is furthermore settable with respect to its shape and/or its dimensions.

For example, the blocking element can be designed based on a settable rotatable disk, which is arranged substantially parallel to the overall detector surface, made of radiation-opaque material for the received radiation, which has a radiation-transmissive opening for the received radiation. For example, the openings and the rotational velocities of two interlocking disks can be designed or set, respectively, such that the transmission region is respectively settable such that different transmission regions define a two-dimensional virtual movement over the detector surface.

BRIEF DESCRIPTION OF THE DRAWINGS

The measuring device according to some embodiments of the invention is described in greater detail hereafter, solely by way of example, on the basis of exemplary embodiments which are schematically illustrated in the drawings. Identical elements are identified with identical reference signs in the figures. The described embodiments are generally not shown to scale and they are also not to be understood as a restriction.

In the specific figures

FIGS. 3a-d: show a schematic illustration of a beam path of a use according to the invention of an SPAD array as a photosensitive surface of a receiver in a measuring device;

DETAILED DESCRIPTION

FIGS. 1a to 1d show exemplary fields of application for measuring devices according to the invention having scanning functionality, for acquiring objects or surfaces in an environment by means of scanning using a laser measuring beam.

Figure 1A:
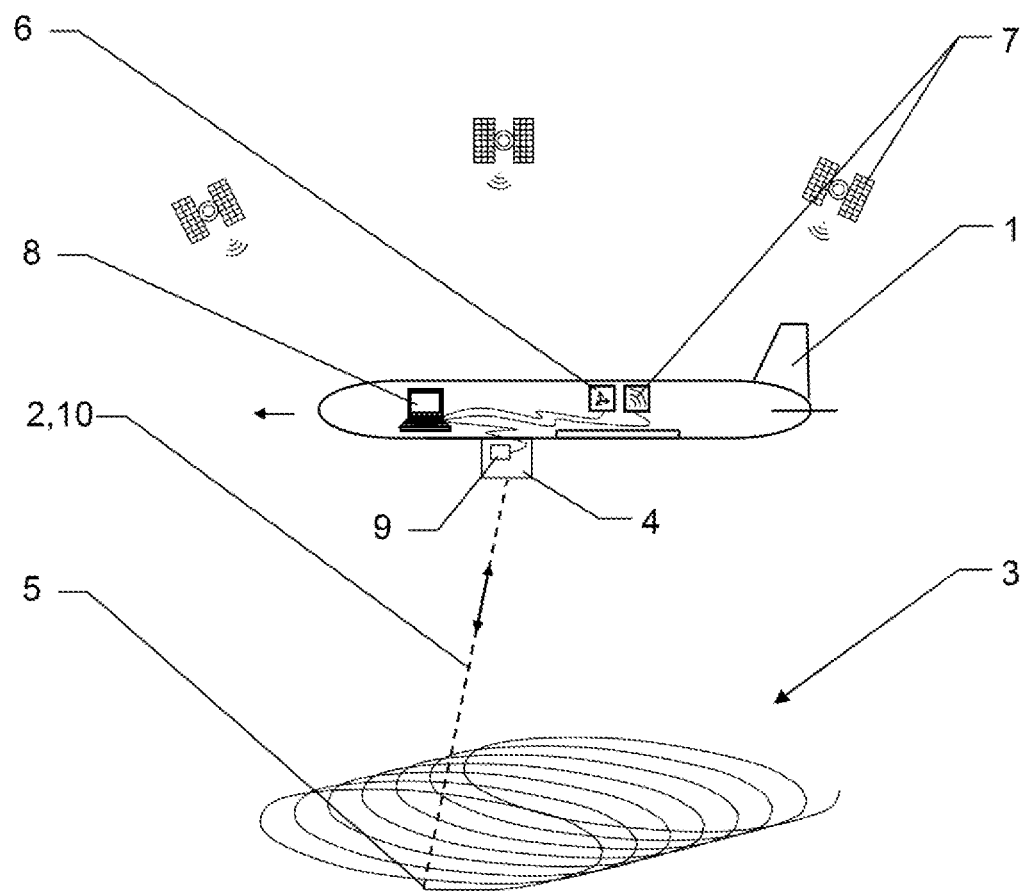
FIGS. 1a-d: show exemplary fields of application for the measuring device according to the invention, for example, a) airborne lidar surveying, b) terrestrial lidar or scanner surveying, c) autonomously driving vehicle, d) total station.

FIG. 1a shows typical airborne surveying based on a lidar system on board an airborne carrier 1, for example, an aircraft. In this case, a transmitted radiation 2 is generated, for example, by short laser pulses, which is deflected according to a defined scanning pattern 3 in the direction of the surface, for example, by means of a movable mirror or by means of a settable refractive optical element. In this case, the surface is mapped, wherein the distance between the measuring device 4 and the associated surface points 5 is acquired, for example, by means of the pulse runtime method, for respective individual targeting directions of the transmitted radiation 2.

The measuring device 4 according to the invention can access in this case, for example, further data for determining a relative or absolute position of the measuring device 4, for example, inertial sensors 6 provided by the carrier 1, height measurement data, or data of a global positioning system 7. In particular, the measuring device 4 can also have separate inertia meters, however, to acquire inertia data with respect to an intrinsic movement of the measuring device 4, for example, a relative displacement and/or tilt of the measuring device 4. Moreover, the measuring device 4 acquires, for example, at least the angles of the transmitter-side laser beam deflection units, wherein the relative or absolute position of the surface points 5 on the object to be surveyed is known.

The additional data can be partially processed by a computer unit 8 of the carrier or the computer unit 9 of the measuring device can be configured such that it directly processes the provided (raw) data, for example, wherein the computer unit 9 of the measuring device continuously derives the position and attitude of the measuring device 4 on the basis of the data and generates, for example, a time curve of the intrinsic movement of the measuring device 4.

The scanning pattern on the object to be surveyed can be generated, for example, based on a simple "zigzag" scanning, for example, by means of a mirror moving back-and-forth ("sweeping") and the forward movement of the airborne carrier 1. Scanning patterns 3 based on circular scanning ("Palmer scanning") are often used, however, as shown in the figure, for example, by means of a rotating inclined deflection mirror or by means of a refractive scanning unit. A spiral-shaped scanning pattern 3 thus results on the surface to be surveyed due to the flying movement. This has the advantage, for example, that thus every surveyed surface point 5 can be respectively acquired from two different viewing angles using one overflight. Thus, for example, shadow effects are minimized and at the same time a large region can be scanned. In this exemplary embodiment, the optical receiving channel and the transmitting channel are conducted via the same scanning elements such as deflection mirrors or polygon wheels.

According to the invention, the measuring device 4 has a receiver based, for example, on an SPAD array, wherein depending on the transmission direction of the transmitted radiation 2, direction-dependent sections of the receiver are defined, in order to adapt the active receiver surface to a varying imaging position of the received radiation 10, for example, to compensate for a targeting error as a result of the finite runtime and a rapidly rotating deflection mirror as a function of the measurement distance.

Figure 1B:
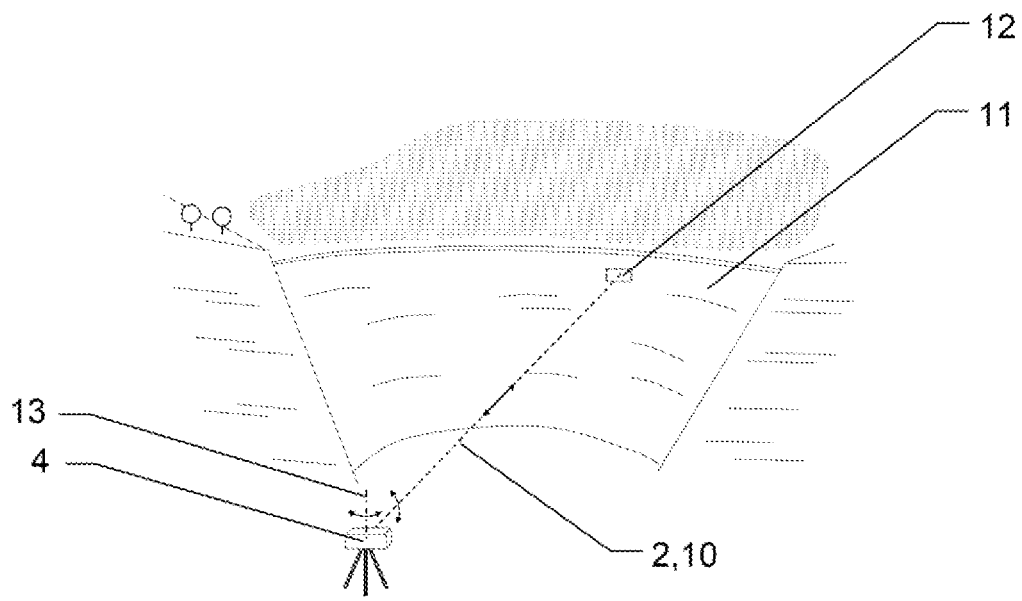

FIG. 1b shows a terrestrial application of a lidar system, designed for moderate to large measurement distances, here, for example, in the field of construction monitoring, for example, for monitoring or checking the integrity of a dam 11 by means of acquiring ultrasmall movements of the dam 11 as a result of varying water pressure.

In terrestrial applications, the measurement distances are often shorter in comparison to airborne surveying, while in contrast the scanning rate can be substantially higher, for example, because of the improved mechanical stability of the carrier 1 or because of the knowledge of existing 3D models of the surface to be surveyed, whereby, for example, already optimized scanning patterns can be used.

For example, the measuring device can be configured to scan a relatively small surface 12 of the dam with high scanning speed and high resolution, for example, based on the pulse runtime principle, wherein a rapidly rotating mirror deflects the transmitted beam 2 along a first direction, for example, to set the height, and the entire measuring system 4 is pivoted back and forth laterally (comparatively slowly) about the axis of rotation 13.

According to the invention, the measuring device 4 has a receiver, for example, based on an SPAD array, wherein depending on the transmission direction of the transmitted radiation, direction-dependent active sections of the receiver are defined, in order to adapt the receiver surface to a varying imaging position of the received radiation 10.

For example, the receiver can be configured such that the respective sections used for the acquisition of the reception signal are "moved up and down" on the receiver along the first direction in the meaning of a "rolling shutter window" (see, for example, also FIG. 4) with the respective set height of the associated transmitted beam 2.

Figure 1C:
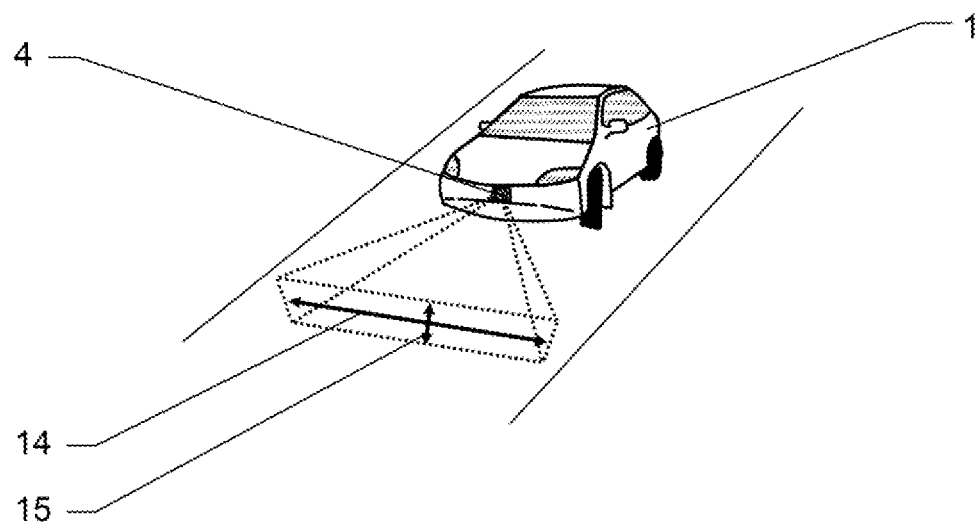

FIG. 1c shows a further application of the measuring device 4 according to the invention in the field of autonomously driving vehicles, wherein, for example, the roads to be traveled are driven down in advance by means of a vehicle 1 equipped with the measuring system 4, to acquire the roads and to image the roads in its model.

Such systems typically require a robust and long-lived construction of the measuring device 4, wherein the most compact possible construction is typically also sought and where possible moving parts are extensively omitted. Moreover, the measuring procedure has to meet specialized requirements, for example, with respect to field of vision and acquisition rate. For example, the horizontal field of vision 14 is to comprise approximately 80°, wherein the required vertical field of vision 15 is typically substantially smaller, for example, approximately 25°. The acquisition rate for the scanning of the complete field of vision is, for example, approximately 25 Hz.

Therefore, MOEMS components ("micro-opto-electromechanical system") or settable or deformable refractive optical elements, for example, liquid lenses, are often used here as deflection elements.

The use according to the invention of a receiver based on an SPAD array has the advantage here, for example, that the optomechanical structure of the receiving channel can be simplified, by the field of vision of the SPAD array occupying the entire transmitter-side scanning region of 80°×25°. As already described, however, only a small portion of the receiver-side field of vision is activated, for example, specifically the domain (activated group of microcells) which encompasses the reception light spot on the SPAD array. Alternatively, the slow horizontal movement of the measuring device 4, for example, can also be conducted on the receiver side via the transmitter-side direction deflection unit, wherein the rapid vertical scanning movement is carried out virtually on the receiver side, i.e., using a one-dimensional vertical activation of the domain on the SPAD array.

Figure 1D:
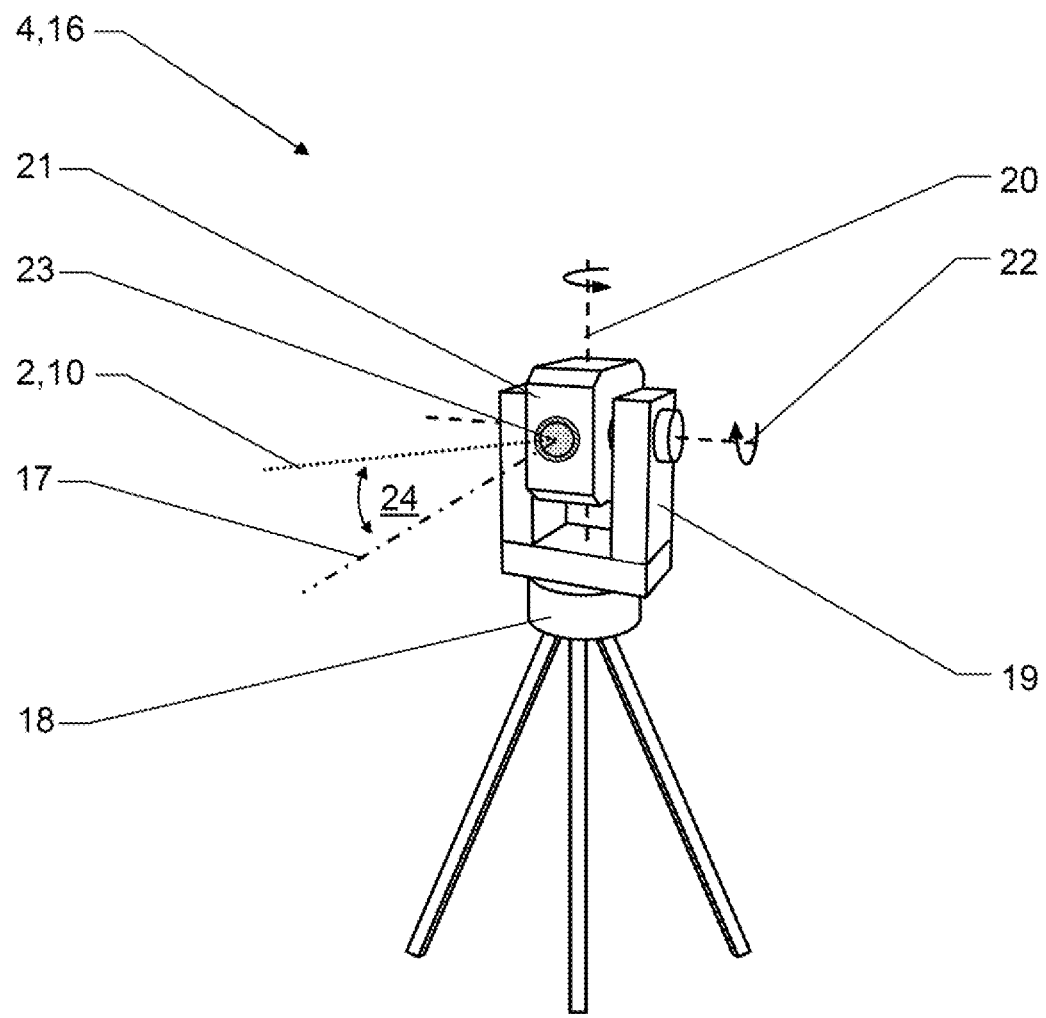

FIG. 1d shows a use of the measuring device 4 according to the invention as a total station 16. Total stations are used, for example, to record properties of defined points in a measuring environment, in particular for recording data with spatial reference, i.e., direction, distance, and angle to measurement points. Total stations therefore typically have directional means for aligning the targeting axis 17 of the total station 16 on a target.

Total stations can furthermore be designed for automatic target tracking, for example, wherein a target is actively illuminated by emitted tracking radiation and is identified and tracked on the basis of the returning radiation, for example, by means of acquisition of the offset of the acquired tracking beam on a position-sensitive diode.

A total station 16 from the prior art has, for example, a base 18 and a support 19, wherein the support 19 is fastened on the base 18 so it is rotatable about a first axis of rotation 20. Furthermore, the total station 16 has, for example, a carrier 21, which is fastened on the support so it is rotatable about a second axis of rotation 22, which is substantially orthogonal to the first axis of rotation 20, wherein the carrier 21 has an optical distance meter for measuring a distance to the target by means of a distance measuring beam 2. The carrier 21 furthermore has, for example, a common exit and entry optical unit 23 for the emitted distance measuring beam (transmitted beam) and associated returning parts of the distance measuring beam 10 (received beam). Alternatively, the carrier can also have a separate entry optical unit and a separate exit optical unit.

For the two-dimensional alignment of the distance measuring beam 2 on a target, typically both the support and also the carrier 21 are moved, wherein for a special surveying task, at least one movement of the support 19 or the carrier 21 is necessary for each measurement procedure, for example. Primarily the support 19, but also the carrier 21, are often comparatively heavy and thus sluggish components, because of which the scanning speed is accordingly limited in the scope of a surveying task.

To elevate the scanning rate, the carrier 21 therefore has, for example, an additional rapid deflection element, for rapid deflection 24 of the outgoing distance measuring beam 2 in relation to the carrier 21. Therefore, a rapid movement of the beam bundle of the distance measuring beam 2 required for the measurement can thus be effectuated within the acquisition region of the entry optical unit 23, without requiring for this purpose the movement of the larger (sluggish) components otherwise required. Points outside the acquisition region of the entry optical unit 23 are acquired by means of a combined movement sequence. The slow or sluggish movements with low acceleration take place by means of support 19 and carrier 21, the rapid movements with high acceleration take place on the transmitter side using known means, for example, polygons (prisms or mirrors), laser arrays, or MEMS deflection means, and on the receiver side by means of the device according to the invention.

According to the invention, the receiver of the distance meter is designed, for example, based on an SPAD array, wherein the actuation of the additional rapid deflection element in the carrier 21 and the acquisition of the reception signal are synchronized such that, based on the transmission direction of the distance measuring radiation 2 (transmitted radiation), the reception signal is acquired based on a set active section of the receiver. On the receiver side, the rapid scanning movement is again carried out virtually, i.e., using a one-dimensional or two-dimensional actuation of the domain associated with the light spot on the SPAD array.

Figure 2:
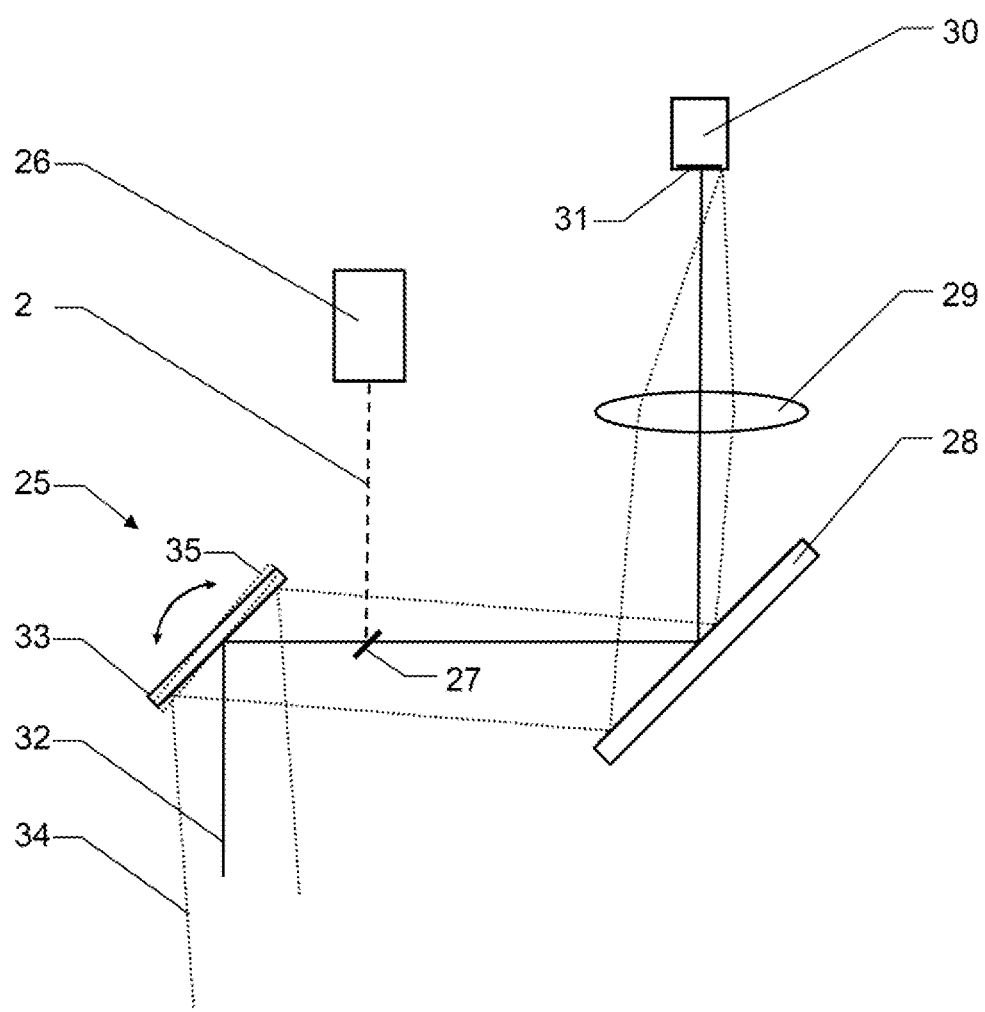
FIG. 2: shows a schematic illustration of an occurrence of a targeting error as a result of the rapid movement of a deflection element and the finite runtime of the transmission signal.

FIG. 2 shows a schematic illustration of an occurrence of a targeting error as a result of the rapid movement of a deflection element 25, a rapidly moving (for example, "sweeping") deflection mirror here, and the finite runtime of the transmission signal.

The transmitting channel has a laser source 26, wherein the transmitted radiation 2 generated by the laser source 26 is coupled by means of a first fixed deflection element into a common transmitting and receiving channel. Furthermore, a moving (for example, "sweeping") deflection mirror 25 is located in the common transmitting and receiving channel, wherein the moving deflection mirror 25 acts both on the transmitted radiation 2 and also on the received radiation. The receiving channel furthermore has a second fixed deflection element 28, an imaging optical unit 29, and a lidar receiver 30 having a photosensitive receiving surface 31.

Furthermore, on the one hand, optical main beams 32 with respect to a present targeting direction, i.e., a present setting 33 of the moving deflection mirror 25, and, on the other hand, main beams 34 with respect to a preceding setting 35 of the moving deflection mirror 25 are indicated. The optical path between lidar receiver and deflection mirror 25 is static for both orientations of the deflection mirror 25.

Because of the finite runtime of an emitted and returning signal and the rapid scanning rate by means of the movable deflection mirror 25, for example, 300 rad/s, the orientation of the deflection mirror 25 has changed between the emission time of the transmitted radiation 2 and the return time of the received radiation. This means that the received radiation is guided at a (distance-dependent) angle offset into the remaining (fixed) reception optical unit. This thus means that the receiver looks away with an offset dependent on the measurement distance from the position where the laser beam is incident on the surface to be scanned. The field of vision of the receiver 30, or the receiver surface 31, respectively, therefore has to cover, for example, a multiple of the diameter of the laser beam. If the lidar scanner can moreover execute a complex two-dimensional scanning grid, the targeting error occurs in all directions of the laser beam, whereby the field of vision requirement for the receiver 30 is thus enlarged once again. Due to the larger receiver surface 31, however, the background light component is also elevated, which results, for example, in a worsened signal-to-noise ratio.

According to the invention, the receiver surface 31 is embodied, for example, as an SPAD array, wherein only the section which comprises the reflected laser spot is relayed to the lidar receiving and analysis unit.

FIGS. 3a to 3d schematically show a use according to the invention of an SPAD array 36 as a photosensitive surface of a receiver. FIGS. 3a, 3b relate in this case to a first transmission direction 37, set by a deflection element 38, which substantially acts only on the transmitted radiation 2, i.e., the optical axis of the receiving channel is substantially static, and FIGS. 3c, 3d relate to a second transmission direction 39, set by the deflection element 38.

FIG. 3a shows a side view of a simplified optical path for the first transmission direction 37, comprising a main axis 40 of a common exit/entry optical unit 41 and a receiver having an SPAD array 36. The deflection element 38 can deflect the transmitted radiation 2 one-dimensionally or two-dimensionally in particular here, i.e., along a first and/or second deflection direction. Furthermore, it is clear to a person skilled in the art that depending on the type of the deflection element 38 used, for example, mirror element, prism, polygon wheel, double wedge, refractive element, movable optical waveguide, or MOEMS component, and operating principle of the radiation deflection thus effectuated, for example, displacement/tilting of the deflection element or electro-optical actuation of optical (for example, refractive) properties of the deflection element, it can be arranged both in a parallel and also in a divergent beam path.

FIG. 3b shows a top view of the receiver, or the SPAD array 36, respectively, from FIG. 3a. According to the invention, the SPAD array 36 has a plurality of microcells and is configured such that the microcells can be read out individually and/or in microcell groups (domains) and sections of the SPAD array 36 which can be read out individually are thus settable. The actuation of the deflection element 38 and the acquisition of the received beam 10 are synchronized in this case such that, based on the transmission direction, the first transmission direction 37 here, the received beam 10 is detected based on a defined section of the SPAD array 36, a first section 42 here.

In a similar manner, FIGS. 3c (side view) and 3d (top view) show the optical path with respect to the second transmission direction 39, wherein a second section 43 for the acquisition of the received beam 10 is defined based on the second transmission direction 39.

In particular, the respective defined active sections 42, 43 can each be optimized with respect to the beam shape of the incident received beam 10. For example, the area of the section can be substantially adapted to the beam diameter of the respective received beam 10, wherein, for example, changes of the light spot size are taken into consideration on the basis of a receiver-side fixed focus optical unit. The background light component can therefore also be kept low for each individual measurement using a receiver which is overdimensioned per se with respect to the beam diameter.

Figure 4A:
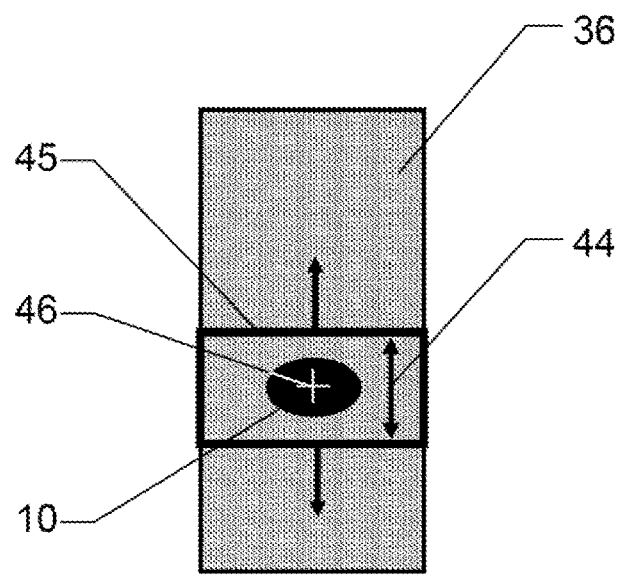
FIGS. 4a, b: show an embodiment according to the invention ("rolling shutter window") with respect to the definition of the individual sections of the SPAD assembly dependent on the transmission direction, for example, a) one-dimensional, b) two-dimensional.

FIG. 4a shows a further embodiment according to the invention with respect to the definition of the individual active sections, which are dependent on the transmission direction, of a sensor designed as an SPAD assembly 36. The sections are defined here similarly to a so-called "rolling shutter" principle, i.e., each section, which is location-dependent and has a direction-dependent effect via the optical unit, is defined by a combination of multiple SPAD lines, wherein the section "rolls" up and down over the SPAD array 36 in a direction perpendicular to the SPAD lines, depending on the present transmission direction, similarly to a rolling shutter window 45 which is variable in the height 44. This definition of sections has the advantage, for example, of a simplified actuation electronics unit, wherein, for example, furthermore the height 44 of the present section 45 can be adapted to the beam diameter of the received radiation 10, for example, as a function of a distance-dependent change of the light spot size.

An SPAD array configured in this manner is suitable, for example, if the beam deflection by the deflection element (see FIG. 3a) is deflected essentially one-dimensionally, i.e., along a deflection direction corresponding to the "rolling direction".

Furthermore, the measuring device can be configured, for example, such that a position of incidence 46 of the received radiation 10 on the receiver, or the SPAD assembly 36, respectively, can be derived, for example, by means of focal point determination or maximum determination of the reception signal. By way of the position of incidence 46 thus derived, the present active section 45 can still be finely adapted in real time to the beam diameter of the received radiation 10. Moreover, by means of the derived position of incidence 46 and the distance measurement data corresponding thereto, for example, the associated transmission direction can be derived, for example, to check angle data with respect to the transmission direction, for example, based on control signals of the deflection element 38, or if necessary to derive an item of correction information with respect to the angle data.

Figure 4B:
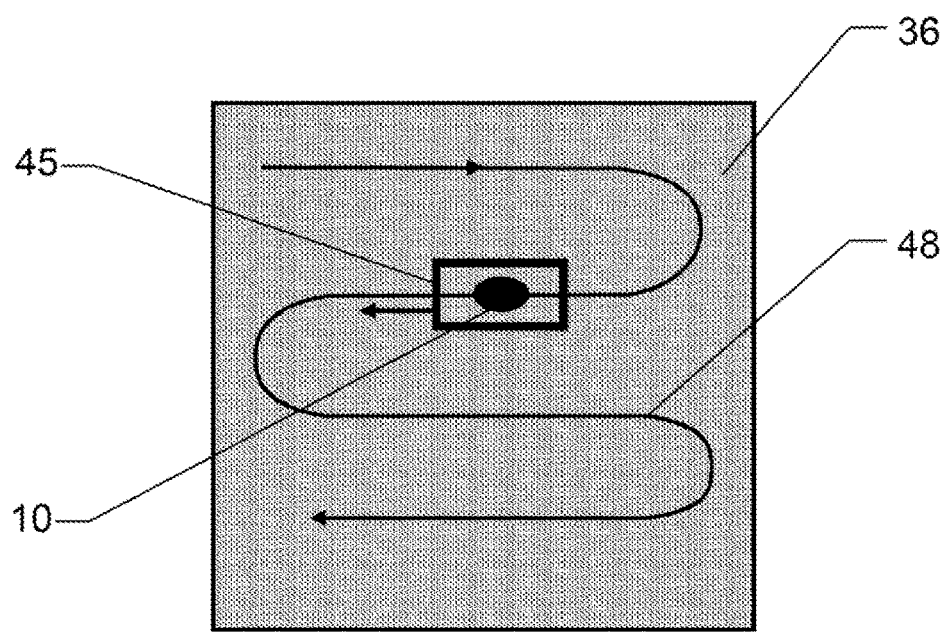

FIG. 4b shows the receiving surface of an SPAD assembly 36 having an active section 45, which is dependent on the transmission direction and is displaced in the two-dimensional direction. The movement track 48 of the light spot 10 on the SPAD array 36 and thus the path of the active section 45, i.e., of the active microcells, is shown, which moves as a domain in a scanning path over the surface of the SPAD array 36. The respective sections are also associated with a direction of the transmitting unit here. If the direction of the transmitted beam moves, for example, in the form of a serpentine line 48, the active section 45 thus moves synchronously in a similar manner on the SPAD assembly 36.

Figure 5:
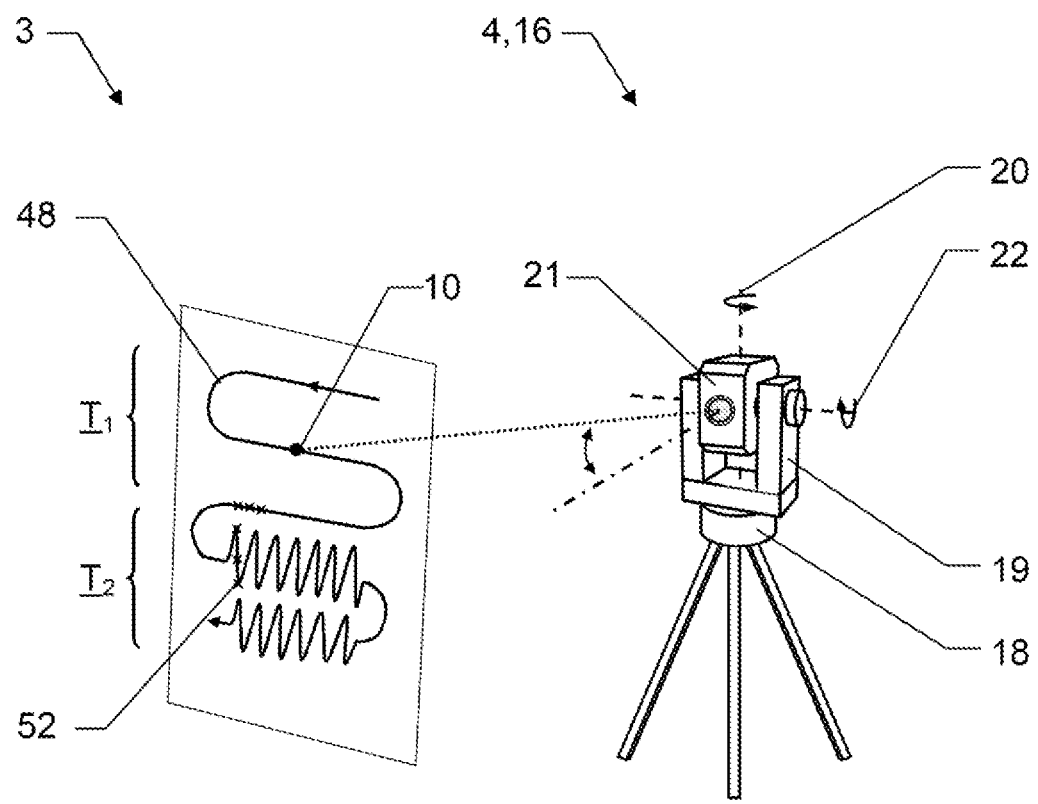
FIG. 5: shows a coordinate measuring device having two-step scanning mechanism based on a receiver-side SPAD array.

FIG. 5 shows a measuring device according to the invention as a total station 16. The instrument is equipped here with a two-step scanning mechanism, based on a first axis of rotation 20 for rotating the support 19 with respect to the base 18, a second axis of rotation 22 for rotating the carrier 21 with respect to the support 19, and at least one rapidly scanning deflection element in the carrier, which can additionally deflect the transmitted beam 10 at high angular velocity.

A scanning pattern 3 in the object space is shown in the figure as a movement track 48, wherein the S-shaped path is generated in a first part $T_1$ solely by rotations of the support 19 and/or the carrier 21 about the first 20 and second 22 axes. In a second part $T_2$, the movement track 48 is generated by means of the additional rapidly scanning deflection element in the carrier 21, whereby a denser surface coverage is achieved. This effectuates, for example, more uniform distribution of the point density on the object surface to be scanned, in particular at very high distance measuring rates of greater than 1 MHz. Without the rapidly scanning deflection element, the measurement points 52 would come to rest densely on a line of the movement track 48, however, measurement points would be absent between the lines. Rapid tracking of the field of vision is also required on the receiver side. By means of the sensor according to the invention, as described with respect to FIGS. 4a and 4b, for example, an active section 45 (FIGS. 4a, b), which is chronologically and spatially synchronized with the transmission direction, is displaced in a one-dimensional or two-dimensional direction, and therefore the signal of the associated laser emission can be relayed in a time-resolved manner to a distance measuring device from a group of microcells.

Figure 6A:
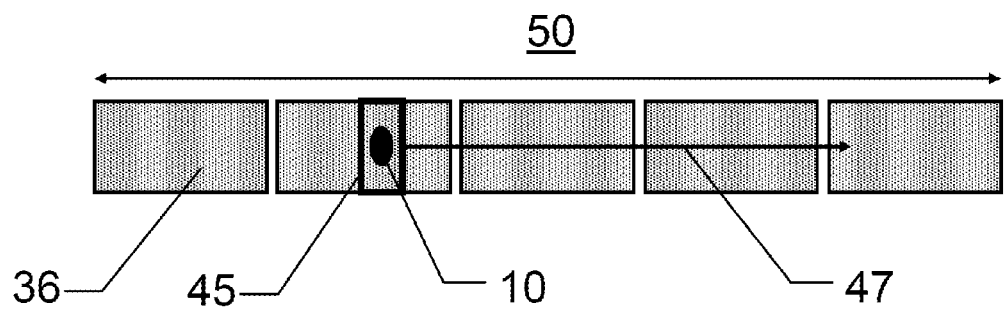
FIGS. 6a-b: show a linear multi-pixel assembly consisting of multiple SPAD arrays for a large-angle scanning region.
Figure 6B:
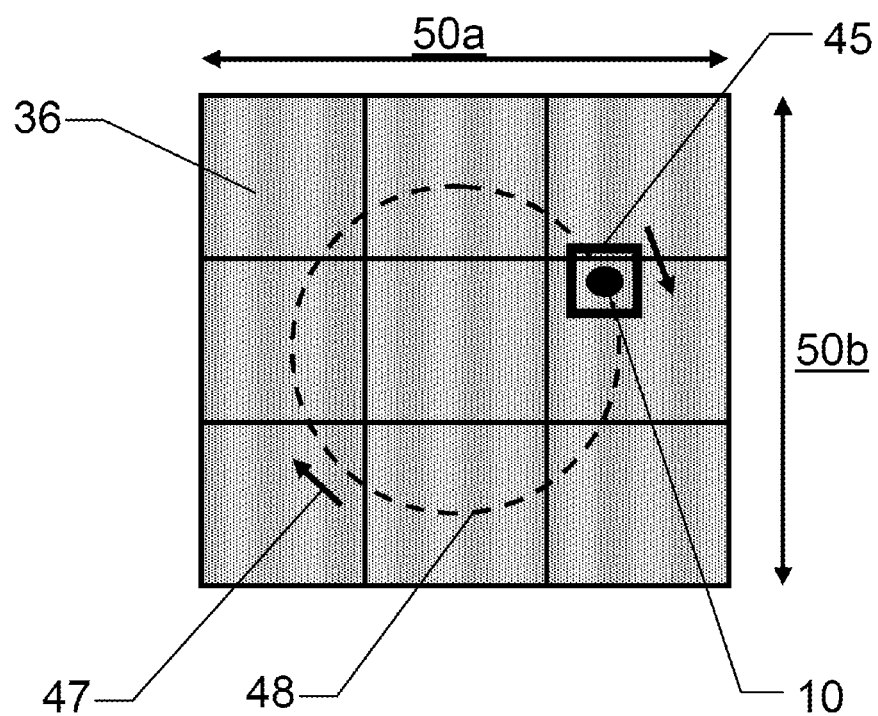

FIGS. 6a and 6b show two further embodiments according to the invention of a photosensor unit suitable for so-called "solid state scanning". In FIG. 6a, the photosensor unit consists of multiple SPAD arrays 36 arranged in a line. This arrangement is suitable, for example, for scanning larger angle ranges in the object space. The received laser spot 10 moves in this case over the multiple SPAD arrays. The active section 45 is moved synchronously with respect to time and position with the reception light spot 10, and therefore the measurement signal is efficiently received, but at the same time as little ambient light per microcell as possible is acquired. The displacement of the section 45 appears as a virtual movement 47 and is indicated in the arrow direction. The achievable field of view 50 of the receiving unit can be dimensioned in a simple manner by means of the number of SPAD arrays 36.

In FIG. 6b, multiple SPAD arrays 36 are illustrated in a two-dimensional multi-pixel arrangement. Each pixel is a separate SPAD array 36. The achievable field of view 50a, b is shown by way of example here based on a 3×3 arrangement of individual SPAD arrays 36. In order that the overall detection surface does not have gaps, for example, SPAD arrays without edge regions can be used. In this example, the movement of the received laser spot describes a circular path 48, wherein the active section 45 encompasses the laser spot 10 and is actuated in such a manner that it moves with the laser spot 10 along a virtual scanning direction 47. If the microcell domain 45 is located completely on an SPAD array, the reception signal of all microcells within the domain 45 is output to a single output signal line, in contrast, if the microcell domain 45 overlaps two adjacent SPAD arrays, then two output signal lines are activated, which can then be combined outside the multi-pixel SPAD array assembly via a multiplexer circuit. However, this signal combining electronics unit can also be implemented, for example, directly on the SPAD array pixels 36 (SPAD array chips).

It is obvious that these illustrated figures only schematically represent possible exemplary embodiments. The various approaches can also be combined with one another and with methods of the prior art.

What is claimed is:

1. A measuring device for optically surveying an environment, comprising:
   a radiation source for generating transmitted radiation;
   a transmitting channel for emitting at least a part of the transmitted radiation;
   a beam deflection element in the transmitting channel, which is configured to deflect the transmitted radiation and to set a chronologically varying transmission direction of the transmitted radiation out of the transmitting channel;
   a receiving channel comprising a receiver, which is configured to acquire a reception signal based on at least a part of the returning transmitted radiation, referred to hereafter as received radiation, wherein the measuring device is configured such that an imaging position of the received radiation on the receiver is stabilized by the beam deflection element being arranged in the transmitting channel and the receiving channel or by a separate beam deflection element being arranged in the receiving channel;
   a control electronics unit, which is configured to control the measuring device based on a preprogrammed measurement procedure;
   an angle determining unit for acquiring angle data with respect to the transmission direction of the transmitted radiation; and
   a computer unit for deriving distance measurement data based on the reception signal; and
   an inertia meter configured to acquire inertia data with respect to an intrinsic movement of the measuring device,
      wherein sweeping scanning is carried out by means of the transmitted radiation by way of the measurement procedure, based on:
         a defined ongoing, continuous actuation of the beam deflection element for the ongoing change of the transmission direction of the transmitted radiation,
         an ongoing emission of the transmitted radiation and
         an ongoing acquisition of the reception signal, and
   a derivation of the distance measurement data, wherein:
      the receiver for acquiring the reception signal has an optoelectronic sensor embodied as multi-pixel photon counter, MPPC, wherein the MPPC comprises hundreds or thousands of microcells and is configured to add currents of the microcells on the sensor and to subsequently convert the added currents into an analog voltage signal, which asymptotically approaches a maximum limiting voltage with increasing received radiation,
      the MPPC is configured such that the microcells are read out in different microcell groups which are conducted to a common output of the MPPC alternately, and active sections, which can be read out individually, of the receiver are thus settable, and in the scope of the measurement procedure, the actuation of the beam deflection element and the acquisition of the reception signal are synchronized such that:
the acquisition of the reception signal takes place based on an active section of the receiver, which is set by taking into account an angle difference occurring between the outgoing transmitted radiation and the received radiation, for which the measuring device is configured:
to acquire a time curve of the intrinsic movement of the measuring device and to estimate the intrinsic movement of the measuring device in advance based on the time curve,
to estimate the angle difference by taking into consideration on the angle data defining the transmission direction of the transmitted radiation, initially acquired distance measurement data, and the estimated intrinsic movement of the measuring device, and
to estimate a first item of imaging information for a beam shape and/or location of the received radiation imaged on the sensor based on the estimated angle difference, wherein the active section used in the scope of the measurement procedure is selected based on the estimated first item of imaging information.

2. The measuring device according to claim 1, wherein the measuring device is configured:
to derive a position of incidence of the received radiation on the sensor, and
to derive an item of correction information with respect to the angle data based on the position of incidence and the distance measurement data.

3. The measuring device according to claim 1, wherein the measuring device is configured, based on feedback of the sensor with respect to a previously acquired reception signal, to estimate a second item of imaging information for a beam shape and/or location of the received radiation imaged on the sensor, wherein the active section used in the scope of the measurement procedure is selected based on the estimated second item of imaging information.

4. The measuring device according to claim 1, wherein the measuring device is configured, based on the distance measurement data, to estimate a third item of imaging information for a beam shape and/or location of the received radiation imaged on the sensor, wherein the active section used in the scope of the measurement procedure is selected based on the estimated third item of imaging information.

5. The measuring device according to claim 1, wherein:
the receiving channel is configured such that the imaging effect of the receiving channel is dependent on the actuation of the beam deflection element, which is arranged such that it acts on the received radiation, and therefore dependent on the actuation of the beam deflection element, a first deflection angle of the transmitted radiation and a second deflection angle of the received radiation are provided, and
the measuring device is configured to estimate the angle difference between the first and second deflection angles, based on an estimation of the time difference between the point in time of the passage of the beam deflection element by the transmitted radiation and the point in time of the passage of the beam deflection element by the associated received radiation,
wherein the active section used in the scope of the measurement procedure is set based on the estimated angle difference.

6. The measuring device according to claim 1, wherein the angle difference is estimated based on at least one element of:
a setting rate of the chronologically variable transmission direction, and
a scanning pattern defined by the measurement procedure for the sweeping scanning by means of the beam deflection element.

7. The measuring device according to claim 1, wherein the angle difference is estimated based on a continuously occurring trend estimation on the basis of previously estimated angle differences, based on the last three immediately preceding angle differences.

8. The measuring device according to claim 1, wherein the receiver has multiple sensors, wherein the multiple sensors are arranged one-dimensionally or two- dimensionally in relation to one another, wherein each sensor has a separate actuation electronics unit and/or analysis electronics unit.

9. The measuring device according to claim 1, wherein the receiver is designed such that a set of active sections which can be read out in parallel with respect to time is definable, wherein the radiation source is configured to generate a bundle of differently oriented and/or spaced-apart laser measuring beams generated in parallel, and the sections of the set of active sections are defined such that they are each associated with a laser measuring beam of the bundle of laser measuring beams.

10. The measuring device according to claim 1, wherein:
the receiver has a radiation-opaque blocking element for the received radiation on the received radiation side,
the blocking element is configured such that a transmission region settable in a chronologically variable manner is set to transmit the received radiation to the overall detector surface of the receiver, and
the position of the transmission region is settable with respect to the overall detector surface, wherein the transmission region is furthermore settable with respect to its shape and/or its dimensions.

11. The measuring device according to claim 1, wherein:
the transmitted radiation is a pulsed laser measurement radiation;
the sensor is designed as an assembly of single-photon avalanche photodiodes; or
the active section is set based on the distance measurement data being with respect to an immediately preceding actuation of the beam deflection element.

12. The measuring device according to claim 1, wherein the inertia meter is configured to acquire inertia data with respect to a displacement and/or tilt.

13. The measuring device according to claim 1, wherein the active section used in the scope of the measurement procedure is selected in consideration of a time curve of initially derived distance measurement data.

14. The measuring device according to claim 1, wherein the estimate of the first item of imaging information for the beam shape and/or location of the received radiation imaged on the sensor is based on a defined fixed focus optical unit of the receiving channel.

15. The measuring device according to claim 1, wherein the measuring device is configured to set the active section of the receiver by using knowledge of an existing 3D model of a surface to be surveyed.

* * * * *